(12) United States Patent
Greven et al.

(10) Patent No.: US 11,290,294 B2
(45) Date of Patent: Mar. 29, 2022

(54) COLLABORATION HUB WITH BLOCKCHAIN VERIFICATION

(71) Applicant: SAP SE, Walldorf (DE)

(72) Inventors: Boris Greven, Weinheim (DE); Frank Albrecht, Walldorf (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 16/592,787

(22) Filed: Oct. 4, 2019

(65) Prior Publication Data
US 2021/0105148 A1   Apr. 8, 2021

(51) Int. Cl.
*H04L 12/18*   (2006.01)
*H04L 9/06*   (2006.01)

(52) U.S. Cl.
CPC ........ *H04L 12/1831* (2013.01); *H04L 9/0637* (2013.01); *H04L 9/0643* (2013.01); *H04L 12/1822* (2013.01)

(58) Field of Classification Search
CPC . H04L 12/18; H04L 12/1822; H04L 12/1831; H04L 9/06; H04L 9/0637; H04L 9/0643; H04L 9/3236; G06Q 10/101; G06Q 10/10; G06F 8/30; G06F 17/30185; G06F 16/901; G06F 16/9024; G06F 16/9027
USPC ........................................................ 709/204
See application file for complete search history.

(56) References Cited

U.S. PATENT DOCUMENTS

| | | | | |
|---|---|---|---|---|
| 10,574,453 | B2 * | 2/2020 | Notani | H04L 9/0643 |
| 10,698,738 | B1 * | 6/2020 | Sun | H04L 9/3239 |
| 10,833,843 | B1 * | 11/2020 | Vijayvergia | H04L 9/30 |
| 2019/0005469 | A1 * | 1/2019 | Dhupkar | G06Q 20/06 |
| 2019/0013948 | A1 * | 1/2019 | Mercuri | G06F 16/27 |
| 2019/0079950 | A1 * | 3/2019 | Ramabaja | H04L 9/3239 |
| 2019/0229890 | A1 * | 7/2019 | Brehmer | H04L 9/3242 |
| 2019/0238525 | A1 * | 8/2019 | Padmanabhan | H04L 63/0428 |
| 2019/0286838 | A1 * | 9/2019 | Wang | H04L 9/0643 |
| 2019/0295038 | A1 * | 9/2019 | Kozloski | G06F 8/71 |
| 2020/0162266 | A1 * | 5/2020 | Miller | H04L 63/0861 |
| 2020/0250590 | A1 * | 8/2020 | Augustine | G06F 16/1837 |
| 2020/0250661 | A1 * | 8/2020 | Padmanabhan | G06Q 20/389 |
| 2020/0322308 | A1 * | 10/2020 | Kempf | H04L 9/3236 |

(Continued)

FOREIGN PATENT DOCUMENTS

CN   1089321899   12/2018

OTHER PUBLICATIONS

European Search Report received in related European Patent Application No. 20196937.5, dated Dec. 14, 2020, 8 pages.

*Primary Examiner* — James N Fiorillo
(74) *Attorney, Agent, or Firm* — Klarquist Sparkman LLP

(57) ABSTRACT

Techniques and solutions are described for facilitating collaborations between entities. A hub computing system is provided that is accessible to multiple client systems. The hub computing system can be used to create instances of collaboration entities, which can be of various defined types. Object instances can be created and included in, or referenced by, the collaboration entity instances. Clients may take various actions with respect to a collaboration entity instance using one or more hub services. At least a portion of the actions taken with respect to a collaboration entity instance can be recorded in a blockchain. The blockchain records can be used to verify actions taken with respect to a collaboration entity instance, and to verify the integrity of collaboration entity instances.

20 Claims, 8 Drawing Sheets

(56) References Cited

U.S. PATENT DOCUMENTS

| | | | |
|---|---|---|---|
| 2020/0344233 A1* | 10/2020 | Lai | G06Q 20/405 |
| 2020/0374129 A1* | 11/2020 | Dilles | G06F 21/45 |
| 2021/0021407 A1* | 1/2021 | Weerasinghe | G06F 16/78 |
| 2021/0083849 A1* | 3/2021 | Liang | H04L 9/3239 |

* cited by examiner

COLLABORATION HUB WITH BLOCKCHAIN VERIFICATION

FIELD

The present disclosure generally relates to software that facilitates collaborations between entities. Particular implementations provide a hub that is accessible to multiple clients, and where at least a portion of activities using the hub can generate blockchain records.

BACKGROUND

It is increasingly common for processes to involve multiple entities. The processes can involve particular objects, such as documents or other structured data (such as data in one or more database tables or instances of abstract or composite data types, including in a serialized form such as XML or JSON). Various issues can arise from these types of collaborative interactions, including related to object integrity and validity. Issues can also arise when the entities involved use different software applications. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating collaborations between entities. A hub computing system is provided that is accessible to multiple client systems. The hub computing system can be used to create instances of collaboration entities, which can be of various defined types. Object instances can be created and included in, or referenced by, the collaboration entity instances. Clients may take various actions with respect to a collaboration entity instance using one or more hub services. At least a portion of the actions taken with respect to a collaboration entity instance can be recorded in a blockchain. The blockchain records can be used to verify actions taken with respect to a collaboration entity instance, and to verify the integrity of collaboration entity instances.

A method is provided of two client systems using a hub system to interact with a collaboration entity instance. A first request is received from a first client computing system. The first request causes a first collaboration entity instance to be instantiated and includes at least a portion of data to be stored in the first collaboration entity instance. The data can include a name or other identifier, one or more objects to be included in the collaboration entity instance (either by reference or by value), or a list of collaborators approved to access information stored in the collaboration entity instance.

A first record is caused to be written in a blockchain. The first record includes a first identifier of the first collaboration entity instance. The first identifier is generated from content of the first collaboration entity instance, which can include content of objects included in, or referenced by, the first collaboration entity instance. In a specific example, the first identifier is a hash value generated by applying a hash function to content of the first collaboration entity instance.

A second request is received from a second client computing system to access the first collaboration entity instance. At least a portion of data stored in the first collaboration entity instance is sent to the second client computing system in response to the second request. A third request is received from the first client computing system or the second client computing system to access a first service provided by the hub system. The hub system is accessible to the first and second client computing systems. The third request is processed using the first service. A second record is caused to be written in the blockchain reflecting the processing of the third request.

According to another embodiment, a method is provided for operating a collaboration hub. A first request is received to create a collaboration entity instance associated with a first type of a first plurality of defined collaboration entity types. The collaboration entity instance is instantiated in response to the first request. A request is made to record in a blockchain a first record corresponding to the instantiating. A second request is received to create a first object instance to be stored in, or associated with, the collaboration entity instance. The first object instance has a second type selected from a second plurality of defined object types. It is requested that a second record, corresponding to including the first object instance in the collaboration entity instance or associating the first object instance with the collaboration entity instance, be recorded in the blockchain. The collaboration entity instance can be accessed and modified by a plurality of client systems, and events for the collaboration entity instance can be verified by accessing the blockchain.

According to a further embodiment, a method is provided for facilitating collaborations between a plurality of client systems using a hub system that includes a plurality of hub services that are configured to record activities related to collaboration entity instances of the hub system in a blockchain. A first request is received from a first client system to instantiate a collaboration entity instance having a first type selected from a first plurality of available, defined collaboration entity types. It is requested that a first record be recorded in a blockchain reflecting the instantiation of the collaboration entity instance. A second request is received from the first client system to instantiate a first object instance having a second type selected from a second plurality of available, defined object types. The first object instance is to be included in, or referenced by, the collaboration entity instance. It is requested that a second record be recorded in the blockchain reflecting the instantiation of the first object instance.

A communication session, such as a chat session, is hosted between the first client system and at least a second client system regarding the collaboration entity instance. It is requested that a third record be recorded in the blockchain reflecting the hosting of the communication session.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
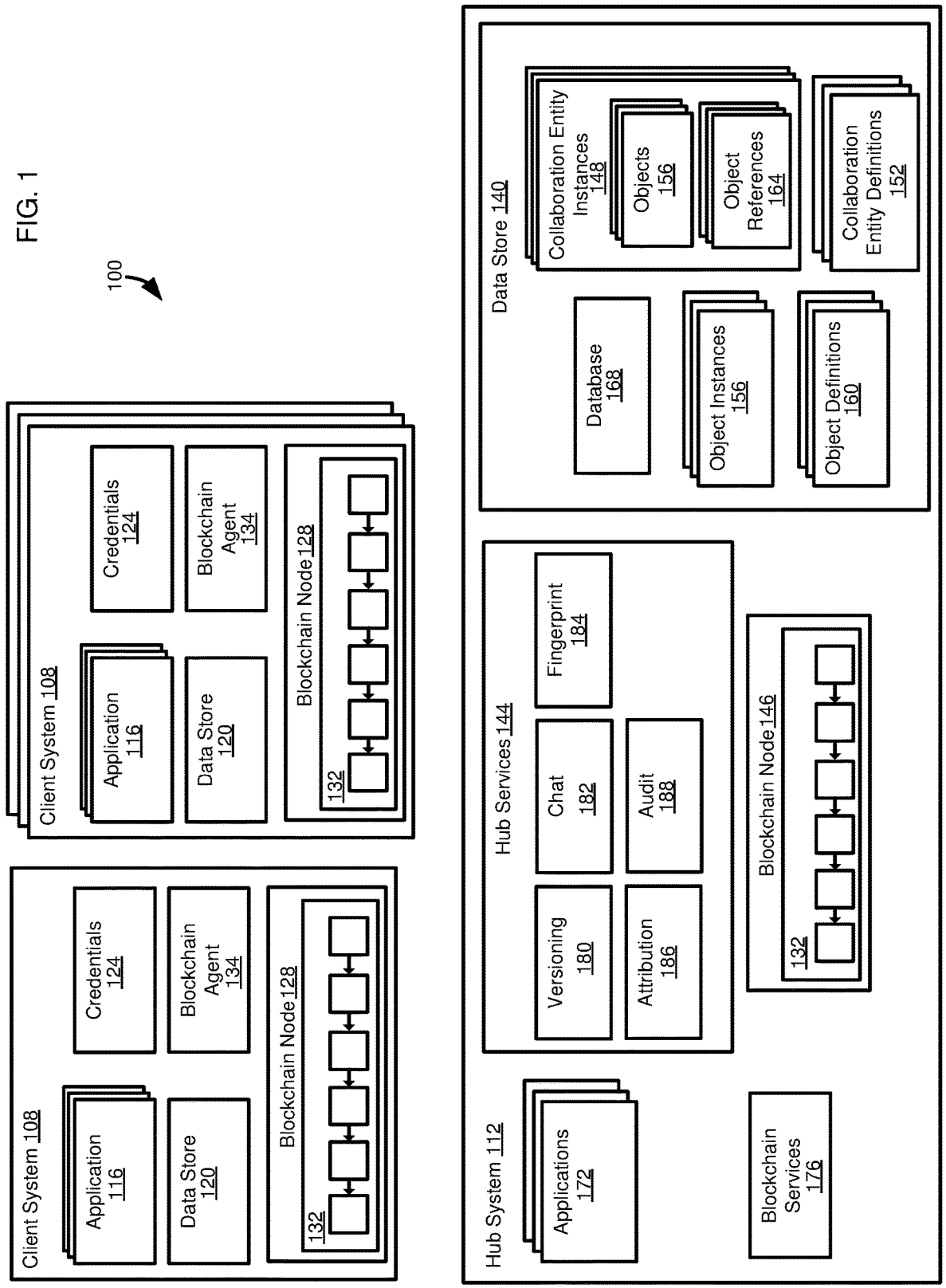
FIG. 1 is a block diagram of an architecture that includes a hub system that is accessible by a plurality of client systems and allows the client systems to access collaboration entity instances stored in the hub system and where events regarding the collaboration entity instances can be recorded in a blockchain.

It is increasingly common for processes to involve multiple entities. The processes can involve particular objects, such as documents or other structured data (such as data in one or more database tables or instances of abstract or composite data types, including in a serialized form such as XML or JSON). For example, negotiating a contract can involve multiple parties, and multiple documents or data collections, such as a project description document, a bid document, and a final contract.

Various issues can arise from these types of collaborative interactions, including related to object integrity and validity. For example, a contract may go through multiple rounds of negotiation and revision before being finalized. It can be important for parties to ensure that they are looking at the correct version of the document. A contracting party may wish, for example, to verify that a contract to be signed is the same as a contract version that they approved.

Issues can also arise when the entities involved use different software applications. The use of different software applications can make it harder to track the flow of documents and other objects, including any changes that were made. In addition, it may be difficult to associate other information, such as communications (e.g., chats or emails), with the documents or other objects. If information is not tracked, easily identifiable and verifiable, and centrally accessible, collaborations can be more difficult, and it can be difficult to audit a process. Accordingly, room for improvement exists.

The present disclosure provides a centralized hub that allows peers to collaborate with respect to instances of collaboration entities, where a collaboration entity can be of a type defined for a particular type of collaboration and can include, or be associated with, various documents, files, or other objects, or with respect to one or more processes (including subprocesses of other processes). The hub can provide various services. Users can share collaboration entity instances, including components thereof, and modify collaboration entity instances, including sharing and modifying the collaboration entity instances on the hub. Users can chat or have other communications regarding particular collaboration entity instances, or elements thereof (e.g., particular documents or objects).

The hub can include an audit function. The audit function can include recording various activities taken using the hub, such as with respect to collaboration entity instances, or elements thereof, stored in the hub or stored using the hub. When a collaboration entity instance, or element thereof, is sent, details regarding the sending (e.g., a sender, a receiver, an indicator of what was sent) can be logged. The audit function can allow audit logs or other data to be collected and optionally analyzed. For example, a user may wish to view all activity related to a collaboration entity instance, or element thereof, or may choose to see details regarding a particular activity, such details regarding the creation and modification of a collaboration entity instance or its elements.

The hub can provide security or authentication services. For example, users of the hub can be associated with identifiers, which can be used as digital fingerprints, so that their interactions using the hub can be tracked, verified, and authenticated. Collaboration entity instances, or their elements, associated with hub activity can be given a fingerprint, including a fingerprint based on their content. Similarly, activities on the hub can be associated with fingerprints, including based on their content.

The hub can also be used to track user's intellectual property rights, such as contributions to a collaboration entity instance that is the subject of intellectual property rights. For example, a document that is stored in the hub, or using the hub, and included in a collaboration entity instance may be associated with copyright protection. Or, a document may describe subject matter that may be the subject of patent or trade secret protection.

The hub employs blockchain technology to track activity on the hub. For example, the hub can cause information regarding a collaboration entity instance, including various event types, object instances, relationships between objects, or service calls, to be written to a blockchain. In a blockchain, a plurality of individual transactions are written in a record, or a block. Periodically, a block is completed and added to a chain of prior blocks. That is, each new block includes the hash value of the prior block, as well as information regarding the transactions included in the newly-written block. Blocks typically include a Merkle root (a hash value of all of the transactions in the block) in their header, with the body of the block containing the underlying transaction data (in a Merkle tree).

Blockchains are typically part of a distributed, peer to peer network. At least a portion of the peers, sometimes referred to as "miners," are involved in the process of forming new blocks. In blockchain networks such as Bitcoin, individual computer nodes ("miners") compete to write new blocks, and receive Bitcoins in return for completing blocks. Other types of blockchains, including private blockchains, may employ varying numbers of writers to keep the blockchain operational, but may not remunerate the writers for these activities (e.g., in a private blockchain, writers may be provided by one or more of the entities that are members of, or otherwise permitted to access, the blockchain, or by a software or infrastructure provider).

Each entity participating in a blockchain typically maintains a copy of the entire blockchain, although in some cases entities may maintain portions of a blockchain. However, the blockchain is typically maintained by multiple computing nodes. Maintaining the blockchain in multiple nodes can provide a number of benefits. For example, as the blockchain is distributed, there is no single point of failure for the information in the blockchain, as compared with, for example, a centralized database. In addition, because the blockchain is distributed, and because the blocks are linked together in a chain, blockchains can provide a high level of data integrity. For instance, the data in an earlier block in a chain cannot typically be changed without also changing the data in the subsequent blocks, as the hash value of the subsequent blocks depends on the contents of earlier blocks.

The disclosed technologies can provide a number of advantages. By providing a hub where parties can create, modify, and share information, entities can collaborate more easily, as their interactions do not require integrating with other entity systems. For example, a single supplier may have a particular software system, and may interact with multiple purchasers using multiple different software systems. Rather than having to integrate with all of the different systems of the purchasers, the supplier merely needs to integrate with the hub.

The hub provides various services, including services that provide a verifiable record of a collaboration entity instance and the activities taken with respect to it. The activities can be recorded in a blockchain, which provides an open record that parties can access. Although the collaboration entity instance, or its components, need not be stored in the blockchain, the blockchain record can include information sufficient to verify the blockchain record, or verify particular collaboration entity instances or elements thereof as consistent with the official record contained in the blockchain.

Example 2—Example Architecture Including Hub System

FIG. 1 is a block diagram of an example architecture 100 in which certain disclosed technologies can be implemented. The architecture 100 generally includes a plurality of client systems 108 and a hub system 112. The client systems 108 can interact with the hub system 112 over a network (not shown), which can be the Internet, in particular examples. However, in other cases one or more client systems 108 may communicate with the hub system 112 in another manner A client system 108 and the hub system 112 may be directly connected. When the client system 108 and the hub system 112 are directly connected, a network protocol, such as TCP/IP can be used. In yet further cases, at least one of the client systems 108 can be integrated into the hub system 112. Similarly, one or more elements of a client system 108, which will be further described, can be located in the hub system 112.

Each client system 108 can include one or more applications 116. The applications 116 can be of various types, but can generally include features related to various type of document creation or editing software, such as word processors, spreadsheet programs, or presentation software. Applications 116 can also include enterprise software, such as applications that provide various functions that help with issues like accounting, finance, human resources, contracting, purchasing, procurement, manufacturing, supply chain management, and the like.

A client system 108 can include a datastore 120. Although shown as a single datastore 120, the datastore can include multiple types of data storage. For example, the data store 120 can include one or more database components. A database component can be a relational database or some other type of database, such as a document store (e.g., for XML or JSON data), a graph database, or a key-value store. The data store 120 can also include a file system, such as for storing documents or persisting other types of object instances, such as instances of abstract or composite data types that are used by the applications 116.

The client system 108 can be associated with credentials 124. The credentials 124 can be specific to the client system 108 overall, or can be specific to a particular user or group of users of the client system. The credentials 124 can be implemented in any suitable manner, including using technologies such as passwords, biometrics, public key authentication, or Kerberos authentication. The credentials can be used in recording and verifying records in a blockchain, as will be further described. Communications within the architecture 100 can be secured, such as using secure sockets layer (SSL) or transport layer security (TLS) technology.

Typically, a client system 108 will include a blockchain node 128, which contains all or a portion of a blockchain 132. As described in Example 1, the blockchain 132 can be used to record information regarding activities associated with the hub system 112, or to store documents or other objects. In some cases, actions taken on a client system 108 can result in entries being recorded in the blockchain 132 that relate to activity on the hub system 112. For example, if an application 116 associates an activity or object with the hub system 112, modifies an object, sends an object to the hub system, or receives an object, a corresponding record can be written in the blockchain 132.

In other cases, one or more, including all, of the client systems 108 do not include a blockchain node 128. The client systems 108 can include functionality to access a blockchain node located on another computing system, such as the hub system 112. Such access can be directly from the client system 108 to the blockchain node, or can be mediated by an application (or operating system or operating system component) located on the computing system hosting the blockchain node. For example, when the blockchain node is located on the hub system 112, a client system 108 can access the blockchain node on the hub system through an application or service provided by the hub system.

When a client system 108 includes a blockchain node 128, the client system can include a blockchain agent 134. The blockchain agent 134 can mediate writing entries to the blockchain node 128 or retrieving data from the blockchain node. The blockchain agent 134 can manage different blockchains 132 that may be accessed by a given client system 108, including storing access information for such blockchains.

As discussed in Example 1, multiple entities, associated with different client systems 108 may collaborate on various projects. The collaboration may be facilitated if the client systems 108 can access common data objects related to the project. The collaboration may be further facilitated if the client systems 108 can verify the integrity or authenticity of such objects, and view information regarding activity associated with such objects.

The hub system 112, as well as the blockchain nodes 128 and blockchain agents 134 of individual client systems 108, can facilitate accomplishing these goals. Typically, if client systems 108 were to communicate with one another, they would do so in discrete pairwise interactions that would typically require integration between the client systems. Integrating a single pair of client systems 108 can require a significant amount of effort, and can potentially raise security and privacy concerns if another one entity is allowed to access the client system 108 of another entity. If a given client system 108 would need to interact with multiple client systems, the work required to integrate all of the different systems can rapidly become unmanageable. Thus, in many cases, client systems 108 remain siloed, and collaborations between entities can be cumbersome and require duplication of data and effort.

The hub system 112 can help address these issues in part using a data store and hub services 144. The data store 140 can be used to create, store, access, and modify various software constructs that might be the subject of a collaboration between client system 108, such as collaboration entity instances or objects that can be associated with collaboration entity instances, both of which will be further described. Thus, the content of the software constructs can be accessed, typically by multiple client systems 108, by accessing the data store 140. Rather than having to integrate with multiple other client systems 108, a given client system can simply be configured to integrate with the hub system 112 in order to share software constructs with other client systems. Or, if a client system 108 does not need to access an actual software constructs, but only information about a software construct (e.g., activities taken relating to the software construct), suitable information can be retrieved using the blockchain agent 134 (or a similar agent that can be provided as a service on the hub system 112).

Separately, the hub services 144 can track activity related to a software construct, where records of such activity can be stored in the blockchain 132, through a blockchain node 146 of the hub system 112 and/or through blockchain nodes 128 of the client systems 108. As will be further described, records in the blockchain 132 can be used to provide an auditable, verifiable record of activities related to the blockchain, and which can be used to verify that the software constructs, whether stored in the data store 140 or a data store 120 of a client system 108 (or elsewhere, such as in memory associated with the hub system 112), are authentic, have suitable integrity, and match corresponding records stored in the blockchain 132.

The software constructs can include collaboration entity instances 148, which can be created according to a plurality of defined types, as defined in collaboration entity definitions 152. A collaboration entity definition 152 can be, or can be similar to, a definition of a class, and can define properties such as data members (e.g., variables or constants associated with a collaboration entity type) and methods supported by the collaboration entity type. Such methods can include various events that are relevant to a type of collaboration entity, and can result in entries to the blockchain 132, as will be further described.

The software constructs can also include object instances 156, which can be created according to a plurality of defined types, as defined in object definitions 160. An object definition 160 can be, or can be similar to, a definition of a class, and can define properties such as data members (e.g., variables or constants associated with an object type) and methods supported by the object type. Such methods can include various events that are relevant to a type of object, and can result in entries to the blockchain 132, as will be further described.

Collaboration entity definitions 152 can allow collaboration entity instances 148 to include a variety of data or metadata, including metadata describing the purpose of the instance, particular parties who may access information in the instance, and restrictions on data that may be viewed by particular parties. Data that can be included in a collaboration entity instance 148 can include object instance 156, or references 164 to object instances. That is, in some cases, collaboration entity instances 148 can include data of an object instance 156, which may be used in generating an identifier, such as a signature, for the collaboration entity instance. In other cases, a collaboration entity instance 148 can include a reference 164 to an object instance 156, where the reference may be used in generating an identifier, such as a signature, for the collaboration entity instance. In yet further cases, a collaboration entity instance 148 includes a reference 164 to an object instance 156, but information from the object instance can be retrieved in generating an identifier, such as a signature, for the collaboration entity instance.

Data in the data store 140, including data associated with collaboration entity instances 148 or object instances 156 can be stored in a database 168. For example, object-relational-mapping can be used to map data from the database 168 to data in a collaboration entity instance 148 or an object instance 156. In some cases, the data store 140 can store multiple versions of a given object instance 156 or collaboration entity instance 148. Although shown in the data store 140, it should be appreciated that object instances 156 or collaboration entity instances 148 can be stored elsewhere, such as in memory accessible to components of the hub system 112, such as the hub services 144, the applications 172, or the blockchain services 176.

In other cases, the architecture 100 can be structured differently. For example, collaboration entity definitions 152 or object definitions 160 can be maintained elsewhere, such as in an application 172. In further cases, the hub system 112 does not maintain collaboration entity definitions 152 or object definitions 160, but can receive and store collaboration entity instances 148 or object instances 156 provided by a client system 108.

In some implementations, hub services 144 can be accessed directly by the client systems 108. In other cases, the hub system 112 can include one more applications 172, which the applications can at least in some cases provide similar functionality as the applications 116 of the client systems 108. The applications 116 of the client systems 108 can include functionality to access the hub services 144 directly or through the applications 172, such as using API or RFC calls. Applications 116 can communicate with the hub system using REST services, such as the OData protocol, or using the SOAP protocol. An application 116 can be, or can incorporate, a web browser that can access web-based applications 172 or hub services 144 of the hub system 112.

The hub services 144, whether being accessed directly or through an application 172, can access the data store 140 and the blockchain node 148. Access to the blockchain node 148 can be provided by blockchain services 176, which include functionality similar to a blockchain agent 134 of a client system 108. Blockchain services 176 can optionally include additional functionality, such as supporting write and read operations, while at least in some cases a blockchain agent 134 may only support read operations. Or, blockchain services 176 can support a broader variety of read or write operations than a blockchain agent 134. Blockchain services 176 may also be configured to support read or write requests from the client system 108, which may be provided directly to the blockchain services by a client system in some cases, rather than through an application 172 or the hub services 144.

The hub services 144 can include a versioning service 180. The versioning service 180 can allow client systems 108 to create and modify collaboration entity instances 148, and optionally object instances 156. For example, the versioning service 180 can receive a request from a client system 108 or from an application 172 to create an instance of a collaboration entity definition 152 or an object definition 160

The versioning service 180 can cause entries to be written to the blockchain 132 for at least a portion of activities associated with creating or modifying a collaboration entity instance 148, or in some cases an object instance 156, such as an object instance that is included in, or referenced by, a collaboration entity instance. The following discussion (of the versioning service 180, and for the discussion of other services of the hub services 144) refers to collaboration entity instances 148 for simplicity, but it should be appreciated that analogous operations can be performed for object instances 156.

Typically, an entry is written to the blockchain 132 when a collaboration entity instance 148 is created or first entered into the hub system 112. An entry can also be written to the blockchain 132 when a collaboration entity instance 148 is modified. Modifications can be indicated by commands to create a modified version of a collaboration entity instance 148, such as commands received from a client system 108, which can be provided directly to the versioning service 180 or through an application 172. In other cases, the versioning service 180 can compare two collaboration entity instances 168, or components used in a collaboration entity instance (e.g., object instances 156 or other data or metadata) to determine that one is a version of the other. Or, when a change is made to a collaboration entity instance 148, a modification flag or other indicator can be set and read by the versioning service 180.

Blockchain entries for collaboration entity instance creation or modification can include information such as a time the event occurred, an identifier of a client system 108 or particular user who created or modified the instance, an identifier for a project that is associated with the instance, information sufficient to determine who may access the instance, and information useable to authenticate, validate, or otherwise verify the legitimacy of the instance. Information useable to determine who may access the collaboration entity instance 148 can be specified in various manners, such as specifying one or more users or one or more client systems 108 that are authorized to access the collaboration entity instance 148. Information useable to determine access privileges can include specifying an access policy, which can be maintained elsewhere, including on the hub system 112, and can be used to determine users of client systems 108 permitted to access the collaboration entity instance 148. A project identifier, or other information associated with a collaboration entity instance 148, can be recorded in an entry in the blockchain 132 and used to determine access privileges (e.g., by consulting information in the data store 140, including data maintained in the database 168, such as a table providing access information for particular collaboration entity instances), in which case a separate indicator of access privileges may be omitted.

Authentication information for a collaboration entity instance 148 is typically selected such that changes to the instance can be determined. In some implementations, authentication information can be generated from contents of the collaboration entity instance 148, including from a representation, such as a binary representation, of the instance.

In specific examples, a hash value is calculated from all or a portion of the contents of a collaboration entity instance 148 or a representation of the contents. The portion selected is sufficient to allow changes to the collaboration entity instance 148 to be determined. For example, for a collaboration entity instance 148 based on a particular collaboration entity definition 152 or template, portions of the instance that will always be the same for any instance of the collaboration entity type can be omitted from content used to generate authentication information.

In at least some implementations, authentication information for multiple versions of a collaboration entity instance 148 can be recorded in an entry in the blockchain 132 for an activity associated with the instance. For example, if a collaboration entity instance 148 is modified, the modification will typically change the authentication information. In order to relate different versions of given collaboration entity instance 148 to each other, a record in the blockchain 132 can include authentication information for a modified version of the instance and for a prior version of the instance, which can include authentication information for the immediately preceding version of the instance or can be the authentication information generated for the original version of the collaboration entity instance.

The versioning service 180, or another component of the hub system 112, can carry out additional functions. For example, the versioning service 180 can be used to track when collaboration entity instances 148 (or information associated therewith, such as referenced or included object instances 156) are accessed, even if no modifications are made. This can be helpful if it may be desired to establish that a particular user or client system 108 viewed or accessed a collaboration entity instance. The versioning service 180 can also be used to track if a collaboration entity instance 148 (or component thereof) is sent outside of the hub system 112, such as to a client system 108. In the case that a command is received from one client system 108 to send a collaboration entity instance 148 (or component thereof) to another client system, an entry in the blockchain 132 can record information including the authentication information for the instance, an identifier for the instance, an identification of the sending time, and identifiers for the sender and receiver.

Additional activities that can be tracked by the versioning service 180 can include tracking changes to access privileges for a collaboration entity instance 148, where any changes can also be recorded in an entry in the blockchain 132. In addition to an identifier for the collaboration entity instance 148 and its authentication information, the entry can include information identifying a party being granted access privileges or whose access privileges are being revoked or modified.

The hub services 144 can include a chat service 182. The chat service 182 can allow users of client systems 108 to exchange messages regarding a particular topic or subject, which can be organized in various manners, such as with reference to a particular collaboration entity instance 148 or object instance 156. When a chat occurs, the chat service 182 can cause an entry to be written to the blockchain 132. The entry in the blockchain 132 for a chat can include information such as an identifier of the relevant collaboration entity instance 148, an identifier of the chat, authentication information from the chat, a link to a record of the chat, a date/time the chat occurred (including, optionally information useable to determine a stop time and a stop time for the chat), a chat type (e.g., whether it was a text, audio, or video chat, and whether any media or object instances 156 were shared or displayed). Chat content can be stored, such as in the data store 140. When a link to chat content is provided, the link can direct to the chat content as stored in the data store 140. However, in order to access the chat content in the data store 140, a user may need to have access to the hub system 112 and have suitable permissions or credentials to access the chat content.

Authentication information for chat content can be generated in a similar manner as described for collaboration entity instances 148. That is, for example, authentication information can be generated from chat content, including from a representation, such as a binary representation, of the chat content. In a specific example, a hash value is generated from chat content, or a representation of the chat content.

The authentication information can be used to confirm that a particular chat record in the blockchain 132 corresponds to a particular chat record in the data store 140.

A fingerprint service 184 can be included as a hub service 144. The fingerprint service 184 can be used to generate and manage credentials associated with client systems 108, or to generate and manage identifiers associated with collaboration entity instances 148 (or components thereof) or events associated with the hub system 112, such as events related to collaboration entity instances. For example, when a new user of a client system 108, or a new client system, is to be provided access to the hub system 112, the user or client system 108 can be assigned credentials, such as a private key. The user or client system 108 can be provided with information needed to access hub services 144 and optionally particular data stored on or managed by the hub system 112, which as in the data store 140. Information provided to a client system 108 or user can include information necessary to set up a blockchain node 128 on the client system or to access a blockchain node stored elsewhere in the architecture 100, such as the blockchain node 146 stored on the hub system 112.

The fingerprint service 184 can also cause entries to be written to the blockchain 132. The fingerprint service 184 can be used to allow users to authenticate particular collaboration entity instances 148 (or components thereof) or actions regarding such instances (or components). For example, if a user wishes to approve a version of a collaboration entity instance 148, such as for release or to create a legal obligation (e.g., signing a contract), the user can provide a suitable command to the fingerprint service 184 and a corresponding record can be written to the blockchain 132. An entry in the blockchain 132 generated by the fingerprint service 184 can include information such as an identifier of a user or party associated with the digital signature, the digital signature of the party, a time of signature, an identifier of a collaboration entity instance 148 associated with the signature, and an action identifier that indicates the purpose of the signature (e.g., signing a contract, accepting a proposal, authorizing a payment).

The hub services 144 can include an attribution service 186. The attribution service 186 can record information in the blockchain related to contributions to a particular collaboration entity instance 148 (including components thereof). In some cases, the attribution service 186 is only used for specific types of collaboration entity instances 148 (or components thereof), such as types where attribution is likely to be important. For example, collaboration entity instances 148 associated with creative works can be associated with records in the blockchain 132 from the attribution service 186 that indicate particular users who are associated with authoring a work. For collaboration entity instances 148 representing technical collaborations, such as research or development proposals or specifications, records in the blockchain 132 from the attribution service 186 can indicate that particular users may be inventors of the technical subject matter or may otherwise have rights in the collaboration entity instance.

The hub services 144 can include an audit service 188. The audit service 188 can be used to find information relating to collaboration object entity instances 148, object instances 156, and information recorded in the blockchain 132, including activities associated with other services of the hub services 144. The audit service 188 can allow for role definitions, such that particular uses of the audit service only have access to particular data associated with the hub system 112. In this way, auditors can be provided with a subset of data needed to conduct an audit, but without providing access to unrelated data. In particular, the audit service 188 can be preferable to allowing auditors access to data directly maintained in a client system 108. When conducting an audit, a user can provide, for example, an identifier for a particular user (e.g., of a client system 108), a particular collaboration entity instance identifier, or a particular object instance identifier. The search can be further filtered, such as by collaboration entity instance, object entity instance, user, date, or for particular services of the hub services 144 (e.g., finding all chats or all versioning activity). Records stored in the blockchain 132 can be used to verify the integrity of data retrieved using the audit service 188.

Example 3—Example Collaboration Entity Implementation

Figure 2:
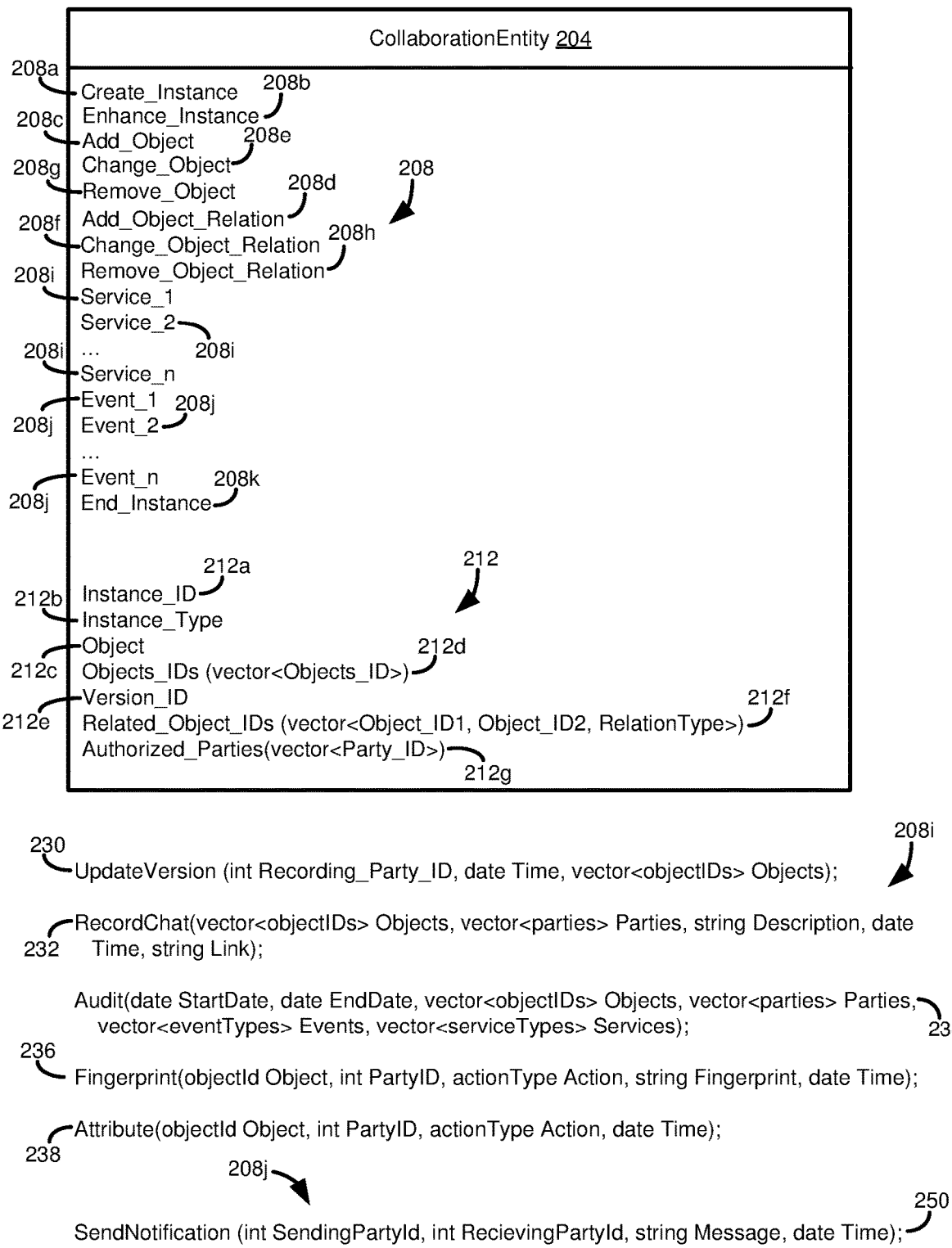
FIG. 2 is example pseudocode for a class that can be used to create and modify collaboration entity instances, and example method calls that can be used to access various hub services that can be used to manipulate collaboration entity instances.

FIG. 2 illustrates a class specification 204 for a CollaborationEntity class. The CollaborationEntity class can represent a generic definition of a collaboration entity, such as a definition 152 of FIG. 1. As discussed in Example 2, collaboration entity instances can be of different types. In some cases, different collaboration entity types can have separate definitions. In other cases, different collaboration entity types can have at least some common definitions, such as having different types of collaboration entities be derived classes of a base class.

The class specification 204 lists methods 208 that can be performed by the CollaborationEntity class. At least a portion of the methods 208 can result in an entry being written to a blockchain, such as the blockchain 132 of FIG. 1. A method 208a, Create_Instance, can be used to create an instance of a particular type (or class or category) of collaboration entity to be tracked using a hub system, such as the hub system 112 of FIG. 1. Collaboration entity types can include types such as products, services, contracts, or creative works.

A method 208b, Enhance_Instance, can be used to add additional properties to a collaboration entity instance. Adding additional properties using the method 208b can include adding relations to other collaboration entity instances. For example, a collaboration entity instance representing a contract may be related to a collaboration entity instance representing a product and a collaboration entity instance representing a service. Enhancing a collaboration entity instance can also include adding metadata that describes the collaboration entity instance. Metadata can include information such as one or more parties (e.g., client systems 108 of FIG. 1, or particular users associated with such client systems) who are collaborating with respect to a collaboration entity instance, and which can be used to specify who may access the collaboration entity instance (which can be different than who may access blockchain entries related to activities involving the collaboration entity instance, including a blockchain entry reflecting creation of the collaboration entity instance). Metadata can also include information specifying a type for the collaboration entity (e.g., product, contract) and optionally one or more additional identifiers for the collaboration entity instance (in addition to a name given to the collaboration entity instance when it is created). Identifiers for the collaboration entity instance can include identifiers that are used by the different parties that are collaborating with respect to the collaboration entity instance.

A collaboration entity instance can be associated with one or more objects (e.g., instances of a class or other abstract or composite data types, or similar or analogous computing artifacts), as described in Example 2. In some cases, a collaboration entity instance can be associated with an object instance having a type that matches the collaboration entity instance type. For example, a contract collaboration entity instance can be associated with a contract object instance. However, collaboration entity instances may be associated with object instances that are of different types, including types that are different than the type of the collaboration entity instance, such as having a contract collaboration entity instance be associated with an object instance for a collaborator associated with the collaboration entity instance (e.g., a "supplier" or "purchaser" object instance) or for other object instances having types used in effectuating the purpose of the collaboration entity instance, such as having a "product" object instance be associated with a "contract" collaboration entity instance that concerns the object instance (e.g., a contract relating to the purchase of the product or a contract relating to having the product produced). Objects can be added to a collaboration entity instance using an "Add_Object" method 208c.

An "Add_Object_Relation" method 208d can be used to create relationships between a collaboration entity instance and object instances, where the object instances are not included in the collaboration entity instance. In some cases, the method 208 can also be used to define relationships between object instances included in a collaboration entity instance, such as object instances added using method 208c. For example, an object relation can indicate that an object instance representing a supplier is a party to a contract represented by another object instance. Or, the method 208d can be used to relate an object instance included in the collaboration entity instance (object instances added using method 208c) to object instances that are referenced by the collaboration entity instance, and which may be relevant to the collaboration entity instance, but which are not added to the collaboration entity instance. In one scenario, a collaboration entity instance representing a contract may be related to an object instance (or, in some cases, another collaboration entity instance) representing another contract that may be relevant to the collaboration entity instance (e.g., a contract for products may be related to a contract for service, or a later contract may be related to an earlier contract).

Objects or relations added using methods 208c, 208d can be changed using respective methods 208e, 208f. Changing an object or relationship can include changing a type associated with an object instance or a relationship type to another object instance, such as changing a supplier instance to a purchaser instance, or changing a "supplying party" relationship to a "receiving party" relationship. In other cases, changing an object or relationship can involve removing an object or relationship and replacing it with another object or relationship. Methods 208g, 208h can be provided to remove objects or relationships, respectively. Methods 208c, 208d, 208g, 208h can obviate methods 208e, 208f, as a change to an object or relationship can be accomplished by removing an object or relationship and adding a new object or relationship.

Methods 208i, Service_1 to Service_n, can represent actions taken with respect to a collaboration entity instance by one or more services associated with a hub system, such as the hub services 144. When a method 208i is called, an appropriate entry can be written to the blockchain, such as an entry representing a new version of the collaboration entity instance or a component of the collaboration entity instance (e.g., an object instance included in the collaboration entity instance) or an entry representing a chat conducted using chat services.

Methods 208j, Event_1 to Event_n, can represent actions taken with respect to a collaboration entity instance beyond those associated with hub services, or particular events that can be registered by a hub service. For example, methods 208j can include events such as indicating that a collaboration entity instance, or object instance included therein, was sent to a party (e.g., a client system 108 or a particular user of a client system), received by a party, approved, rejected, or passed a particular workflow or lifecycle stage.

In some cases, the methods 208i, 208j can be specific to a specific collaboration entity type, while other methods can be general for multiple, including all, collaboration entity types. As discussed above, in the case where different collaboration entity types have different methods 208i, 208j, the class specification 204 can represent a parent class, and derived classes can be used to implement features (e.g., methods, but possibly data members as well, including those representing metadata for an entity instance) specific to specific collaboration entity types.

A method 208k can be provided to end a collaboration entity instance. In some cases, ending a collaboration entity instance can delete the collaboration entity instance. In other cases, ending a collaboration entity instance does not delete the collaboration entity instance, but indicates that the subject of the collaboration entity instance is complete or terminated. Ending a collaboration entity instance, in some implementations, can prevent further modifications to the collaboration entity instance.

The class specification 204 can define a plurality of data members 212. At least a portion of the data members 212 can be general, and used for any collaboration entity type. Data members 212 can include data members that are specific to a particular collaboration entity type or subset of collaboration entity types. For data members 212 that may not be relevant to all collaboration entity types, the data members can be included in classes that are derived from the class specification 204. Or, data members 212 not relevant to a particular collaboration entity type can simply be unused if included in a general class specification.

Data members 212 can include a data member 212a representing an identifier for the collaboration entity instance. The identifier is typically a unique identifier and may be the same as, or different than, a name used for a collaboration entity instance upon instantiation. For example, if a command to create a collaboration entity instance is "CollaborationEntity entity1," "entity 1" can be the runtime identifier used for the collaboration entity instance. The data member 212a can be provided with the value "entity 1," or with another identifier (e.g., "contract123ABC"). The data member 212a can be used, in some implementations, to provide an identifier that can be used in serialized or persisted representations of the collaboration entity instance (e.g., a collaboration entity instance as represented in a file, or in a format such as XML or JSON).

A data member 212b can be used to store an instance type for the collaboration entity instance, where an instance type can be a type such as contract, product, service, or creative work. In other cases, the data member 212b can be omitted, such as when different classes are provided for different collaboration entity types.

A data member 212c can be used to store one (or more) objects associated with the collaboration entity instance, such as an object for a contract, a party (e.g., supplier or purchaser), a request for quotation, or a quotation. In other cases, rather than, or in addition to, storing objects using the data member 212c, objects can be referenced using an object ID data member 212d, which holds identifiers (and optionally access information, such as a URI) for objects related to the collaboration entity instance. As shown, the object ID data member 212d can be implemented as a vector (or array), but can be implemented in another manner, including in other data structures (e.g., a list, queue, heap, graph, tree, etc.).

A version of the collaboration entity instance can be indicated using a data member 212e. As discussed in Example 2, when a collaboration entity instance, or an object in the collaboration entity instance, is altered, a new version of the collaboration entity instance can be created. In some cases, versions can also be created for objects associated with a collaboration entity instance. When the collaboration entity instance is changed (including based on a change to an object instance in, or referenced by, the collaboration entity instance), the value of the data member 212d can be updated.

A data member 212f can be used to store relationships between object instances that are included in, or referenced by, a collaboration entity instance. Although relationships can be identified and stored in a number of ways, data member 212f is shown as a vector of relationships, where a relationship is indicated by the identifiers of the object instances that are related and an indicator of the relationship type between the object instances (for example, "party to contract," "product referenced in contract").

A data member 212g can be used to store permissions information for a collaboration entity instance. The permissions information can indicate parties that are able to change a collaboration entity instance or to request actions with respect to a collaboration entity instance, including actions to call a method 204, which can include actions to write a blockchain entry related to the collaboration entity instance. However, the permissions information can be implemented in a different manner. In some cases, the data member 212g can specify both parties that can access the entity instance, and actions that the parties may take regarding the collaboration entity instance, including particular data associated with the collaboration entity instance that can be viewed or accessed by a party.

The data member 212f can help enable role specific views on data associated with a collaboration entity instance. For example, in the case of a contract, parties related to the contract can have roles such as purchaser, contractor, and subcontractor. Information provided to a purchaser or contractor may be different than information provided to a subcontractor. While a purchaser or contractor may view all information related to a collaboration entity instance, a subcontractor may only be permitted to view certain information related to the entity instance (e.g., particular object instances, or particular data elements of particular object instances). Thus, a collaboration entity instance can be associated with role specific views on data included in the collaboration entity instance.

An auditor role can be defined that allows an auditor to access particular data of a collaboration entity instance, including data associated with multiple other roles. Allowing auditors to access the hub system can be beneficial, as the auditor can perform an audit using data stored in the hub system, without accessing data stored on client systems. Records stored in the blockchain help to verify the data stored in the hub system.

FIG. 2 illustrates examples of particular methods 208i that represent actions taken with respect to a collaboration entity instance by a hub service, and of an example method 208j that is associated with an event. An UpdateVersion method 230 include parameters for a party requesting that the collaboration entity instance (or an object therein) be updated to a new version. In some cases, the method 230 can be called directly by an end user. In other cases, the method 230 can be implicitly called, such as when a user takes a particular action (e.g., in an application of a hub system, such as an action to save or commit changes to a collaboration entity instance, including to a particular object associated with a collaboration entity instance).

The method 230 can include a parameter for a time at which the collaboration entity instance was modified. The method 230 can include, such as in a vector, a parameter for object identifiers for any objects that were modified. Accordingly, the method 230 can be used to reflect both that a collaboration entity instance was modified, and to specifically reflect particular objects associated with the collaboration entity instance that were modified.

Method 232 represents an example method for recording a chat event. The method 232 includes a parameter for indicating objects discussed in the chat, such as in the form of a vector with the object identifiers for objects discussed in the chat. In other implementations, the parameters indicating objects discussed in the chat can be omitted, such as if it is desired to record that a chat occurred regarding a particular collaboration entity instance, but it is not desired to enumerate objects discussed in the chat.

The method 232 includes a parameter indicating parties participating in the chat, such as in the form of a vector that includes identifiers of the participating parties. The method 232 can include a parameter, such as a string, providing a description of the chat (e.g., the subject matter), and can include a value for a time at which the chat occurred. In at least some cases, chat contents (e.g., video, audio, text, screenshares) can be captured and made available for retrieval. When the chat contents are available, the method 232 can include an identifier, such as a string, that acts as a link to the chat contents. The link can be a URI, or other information useable to access chat contents, such as in a data store associated with the hub system.

Method 234 represents an example method for an audit event. The method 234 includes parameters that indicate what information was being audited, such as information associated with particular parties, particular objects, particular dates, or a combination of these filters. For example, the method 234 can include parameters of a start date and a stop date the define a window of relevant information. The stop and start dates can be selected, if desired, to retrieve all relevant events (e.g., from Jan. 1, 2001 to Dec. 31, 2100).

A parameter, such as a vector of one or more object identifiers, can be included for the method 234 to indicate particular objects associated with a collaboration entity instance that are relevant to the query. Similarly, the method 234 can include a parameter useable to indicate parties whose actions or information is relevant to the audit request. The parameter for relevant parties can be a vector of one or more party identifiers. A value, including a null value, can be used for the object parameter or party parameter to indicate, respectively, that records for any object or for any party are relevant to the audit request.

The method 234 can include parameters indicating particular service types or event types that are relevant to the audit. These parameters can be vectors of service type identifiers or event type identifiers, respectively. A particular value, such as a null value, can be used to indicate that all services, all events, or both, are relevant to an audit request.

A method 236 represents an example method for fingerprint service activity with respect to a collaboration entity instance. The fingerprint service, in some cases, can be used to record activities, such as approvals, that can create legally binding obligations. A fingerprint service may be used to replace other physical or digital signature processes. The method 236 can include a parameter that indicates an object identifier that is associated with a call of the method 236. In other implementations, the object identifier parameter is omitted, or a value can be omitted when the method 236 is called, if the signature is to be recorded with respect to a collaboration entity instance, generally, rather than any specific object associated with the collaboration entity instance.

The method 236 includes a parameter indicating a party providing the fingerprint (e.g., for an authorization). A parameter can be included that indicates a particular action being taken by the party (e.g., approving a contract). Security credentials associated with the party can be a parameter of the method 236, and can be used to confirm that the method call 236 is legitimately being called on behalf of the identified party. A time associated with the fingerprint can be included as a parameter for the method 236, which can indicate when the indicated party provided approval for the fingerprint to be associated with the collaboration entity instance.

A method 238 can be used to record an attribution for a collaboration entity instance, including for a particular object instance associated with the collaboration entity instance. The method 238 can include a parameter indicating an object associated with the attribution. In some cases, the object identifier can be omitted, such as when the attribution is to be associated with the collaboration entity instance, generally, rather than a specific object associated with the collaboration entity instance.

The method 238 includes a parameter providing an identifier of a party associated with the attribution. The party can be, for example, a party that is being indicated as an author on a creative work or as an inventor or contributor to technical subject matter (e.g., information that may be the subject of patent or trade secret protection). A parameter of the method 238 can indicate an action (or attribution) type, such as whether the attribution is associated with copyright or patent protection. A parameter can provide a time when the attribution was requested.

Methods 208j can be generally similar to the methods 208i, including parameters relevant to a particular event type. As an example, method 250 can represent an event that sends a notification or message from a sending party to a receiving party. The method 250 can be called, for example, when action is being requested of the receiving party by the sending party. The method 250 can include parameters providing identifiers for a sending party and for a receiving party. The method 250 can also include a parameter, such as a string, providing the message content, and a parameter providing a time the message was sent.

The methods 208 can result in entries in a blockchain. However, it should be appreciated that information recorded in the blockchain need not correspond, at least not identically, to any parameters associated with the methods 208. That is, blockchain entries can include some information that is not included as a parameter to a method 208, and can exclude some information that is included as a parameter in a method. For example, in the method 236, security credentials provided in the method call can be used to confirm its authenticity, but may not be recorded in a blockchain entry. In a call of the method 230, a blockchain entry can include an identifier associated with an original version of the collaboration entity instance (e.g., generated from its contents) and an identifier associated with the updated version of the collaboration entity instance (e.g., generated from its contents), even though this information is not shown as being included as parameters of the method.

Example 4—Example Collaboration Entity Instance Use Scenario

Figure 3A:
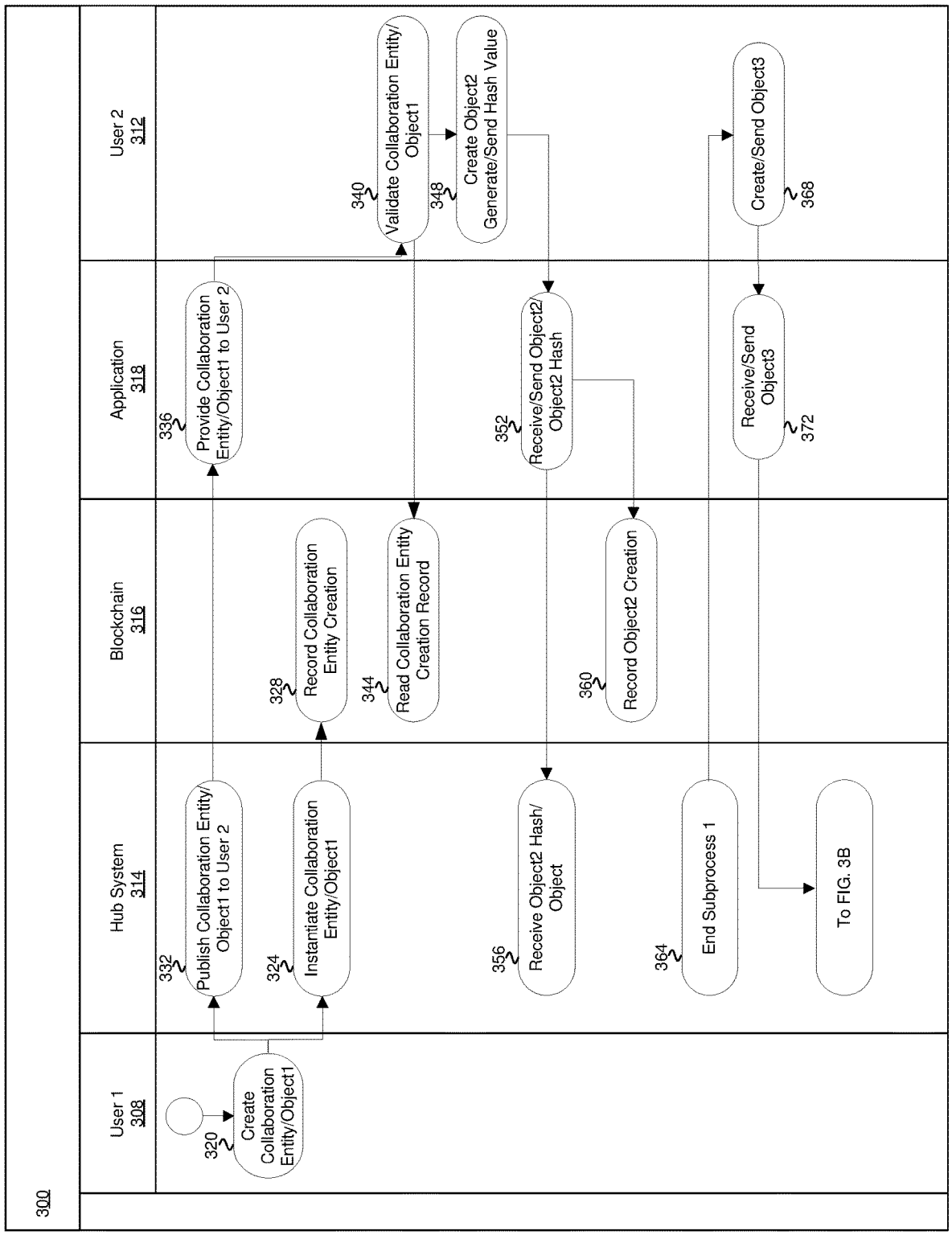
FIGS. 3A and 3B are activity diagrams illustrating a scenario where two client systems can interact with a collaboration entity instance hosted on a hub system, and where at least certain activities are recorded in a blockchain.
Figure 3B:
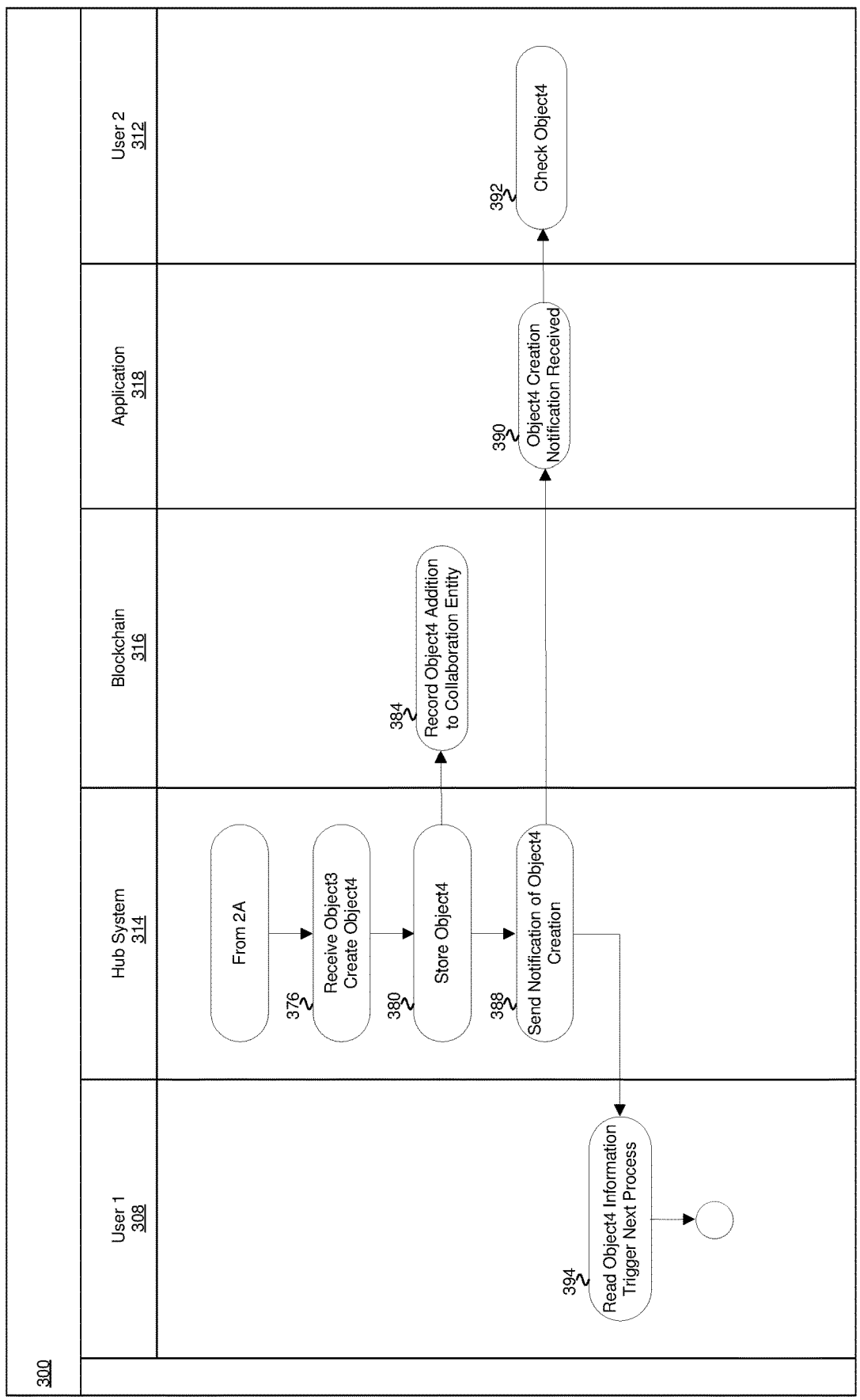

FIGS. 3A and 3B illustrate a scenario 300 where first and second users 308, 312 (which can be associated, respectively, with first and second client systems) can interact with a collaboration entity instance hosted on a hub system 314. At least certain activities regarding the collaboration entity instance can be recorded in a blockchain 316. The second user 312 can access an application 318, which can communicate with the hub system 314 and with the blockchain 316.

In the described scenario, the first user 308 is described as interacting with the hub system 314. In some implementations, the first user 308 can directly interact with the hub system 314, such as through a software application, including a web browser. In other implementations, actions taken by the first user 308 can be carried out by a software application (e.g., request to create object instances) executing on a computer system of the first user and the results of those actions can be sent to hub system 314 by such software application (e.g., data corresponding to the first object instance can be sent to the hub system 314).

Similarly, the disclosed embodiments refer to actions taken by the second user 312, including actions taken using the application 318. In some cases, the actions are performed by the application 318 on a local client system of the second user 312 and the results of the actions (e.g., generated object instances, updated to a collaboration entity instance) are sent from the application to the hub system 314. In other cases, the second user 312 uses the application 318 to access the hub system 314, and actions described as performed by the second user or the application are performed directly on the hub system using the application as an interface to the hub system.

At 320, the first user 308 creates a first collaboration entity instance, and creates a first object instance to be stored in, or referenced by, the first collaboration entity instance. Creating a first object instance at 320 can be carried out on the first client system, and the first object instance can be sent to the hub system 314. Or, the first user can access the hub system 314 and the first object instance can be created on the hub system at 320.

If the first object instance was not created on the hub system 314 at 320, it is created on the hub system at 324. Creating the first object instance on the hub system at 324 can include creating a copy of the first object instance created at 320, such as storing or instantiating the first object instance on the hub system 314 based on information for the first object instance sent by the first user 308. Creating the object on the hub system at 324 can also include creating a collaboration entity instance for the object, if the object created at 320 was not a collaboration entity instance. In some implementations, the first user 308 explicitly specifies a collaboration entity type to be instantiated. In other cases, a collaboration entity type to be instantiated can be inferred, such as based on an object type of the first object instance, or based on an application associated with a request to instantiate a collaboration entity instance at 324.

The hub system 314, at 328, can record, or cause to be recorded, in the blockchain 316 a record indicating the creation of the collaboration entity instance. The record can include an identifier for the collaboration entity instance, which can be based on the contents of the collaboration entity instance, including any objects stored in, or referenced by, the collaboration entity instance. At 332, the hub system 314 can publish the collaboration entity instance, or particular object instances in, or referenced by, the collaboration entity instance (e.g., the first object instance), to an application 318 of the second computing system, which can be provided to the second user 312 at 336. In other cases, the collaboration entity instance or first object instance is not sent at 332, but rather a notification is sent (such as to the application 318) that the collaboration entity instance/first object instance are available in the hub system 314. Providing the collaboration entity instance/first object instance to the second user at 336 can include providing access to the collaboration entity instance/first object instance through the hub system 314.

The second user 312 can validate the collaboration entity instance/first object instance at 340. Validating the collaboration entity instance/first object instance at 340 can include determining whether a record for the collaboration entity instance/first object instance exists in the blockchain 316. In at least some cases, the second user 312 can directly access the blockchain 316 to read the creation record, such as shown at 344. In other cases, a validation request can be sent to the hub system 314.

At 348, the second user 312 can create a second object instance to be stored in, or referenced by, the collaboration entity instance, or can otherwise update the collaboration entity instance. For example, the collaboration entity instance can represent a request for quotation ("RFQ"), or a request for quotation process. The first object instance can correspond to the actual RFQ specified by the first user 308. The second object instance created by the second user 312 at 344 can represent a quote responding to the RFQ collaboration entity instance/first object instance. Generating a second object instance at 348 can include generating the second object instance on the hub system 314. In other implementations, generating a second object instance at 348 can include generating the second object instance using the application 318, and the generated second object instance can be sent to the hub system 314.

An identifier, such as a hash value, can be generated at 348 for the second object, or for a version of the collaboration entity instance that includes the second object instance. The identifier can be generated from the contents of the collaboration entity instance and/or the second object instance created at 348. The identifier can also be sent to the application 318 at 348 if the second object instance was not created on the hub system 314. If the second object instance was created on the hub system 314 at 348, the hash value may have been calculated by, and be stored on, the hub system.

At 352, the application 318 can send the identifier to the hub system 314 (if the identifier was not created on the hub system). If the second object instance was not created on the hub system 314 at 348, the second object instance (or optionally an updated version of the collaboration entity instance that includes, or includes a reference to, the second object instance) can be sent to the hub system at 352. The hub system 314 receives the identifier, and optionally the second object instance, at 356.

When the hub system 314 receives the second object instance at 356, or of the second object instance was created on the hub system at 348, the hub system can store the second object instance in the associated collaboration entity instance. If the hub system 314 received the second object instance from the application 318, the hub system 314 can also verify the integrity of the second object instance, such as by calculating a hash value of the second object instance (or the version of the collaboration entity instances that includes or references the second object instance) and comparing it with a received hash value.

The application 318, at 352, can also cause an entry to be written at 360 in the blockchain 316 that indicates that the second object instance created at 348 was added to the collaboration entity instance. If the application 318 is used to create the second object instance directly on the hub system 314, the hub system can request the recording at 360.

The scenario 300 can be associated with different stages. In the example of an RFQ process, the stages can include opening the RFQ, receiving quotes, closing a quote period and choosing one or more suppliers, preparing a formal quote, and accepting the formal quote. These different stages, or subprocesses, can, in some cases, result in entries in the blockchain 316.

At 364, a subprocess, such as a quote period, is ended. In a next subprocess, the second user 312 can be informed, also at 364, that further action is required. In response to the communication at 364, the second user 312 can prepare a third object instance for the collaboration entity instance at 368. The third object instance can be a formal quote that can be provided to the application 318 at 368. In some cases, the application 318 receives the third object instance at 372, and sends the third object instance to the hub system 314. In other implementations, the application 318 created the third object instance on the hub system 314 at 368, so the third object instance need not be sent to the hub system. The scenario 300 is further described with respect to FIG. 3B.

If the third object instance was not created on the hub system 314 at 368, the hub system 314 receives the third object instance at 376, and can store the third object instance, or a reference to the third object instance, in the collaboration entity instance. The hub system 314 (including in response to input from the user 308) can create a fourth object instance at 376. The fourth object instance, in the described scenario, can be an award generated in response to the formal quote. At 380, the fourth object instance, or a reference to the fourth object instance, can be stored in the collaboration entity instance. In response to this request to update the collaboration entity instance, the blockchain 314 can be instructed to write a record at 384 indicating the update of the collaboration entity instance. The record can include an identifier, such as a hash value generated from the updated content of the collaboration entity instance, including the reference to, or content of, the fourth object instance.

A notification of the creation of the fourth object instance can be sent by the hub system 314 at 388. The application 318 can receive the notification at 390, which in turn can be accessed by the second user 312 at 392. The first user 308, at 394, can determine that the scenario 300 is complete, and can end the collaboration entity instance, which in some cases can cause an entry to be generated in the blockchain 316. Ending the scenario 300/collaboration entity instance can trigger additional scenarios, which can also involve collaboration entities. For example, 394 can trigger a contracting process that can be associated with a collaboration entity instance for the contracting process, and can include object instances related to the contracting process, including objects that are included in the collaboration entity instance for the scenario 300. The collaboration entity instance for the contracting process can optionally include a reference to the collaboration entity instance for the scenario 300.

Example 5—Example Methods Using Collaboration Entity Instances

Figures 4A, 4B:
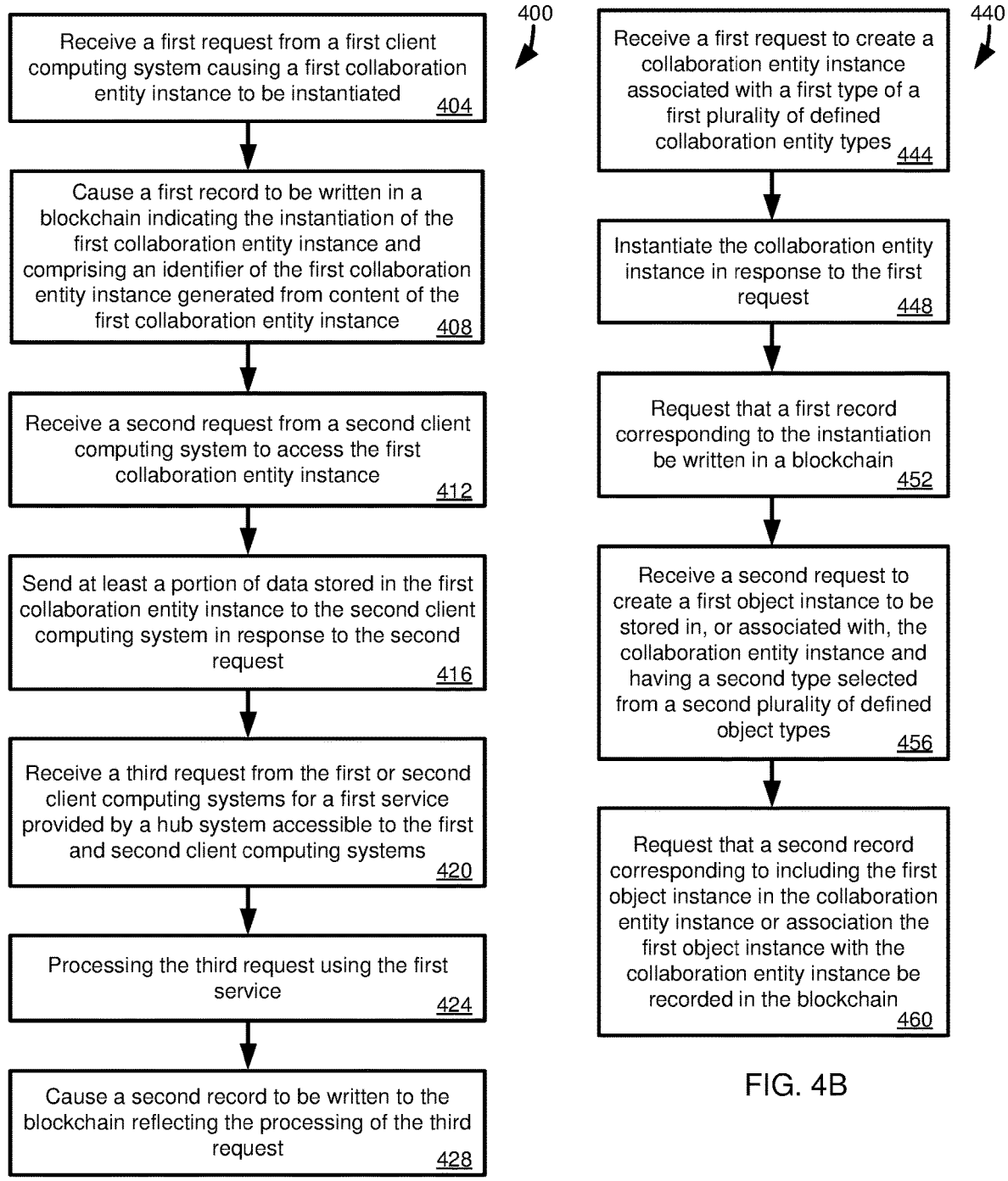
FIGS. 4A-4C are flowcharts of example methods for a hub system interacting with client systems regarding collaboration entity instances.

FIG. 4A is a flowchart of an example method 400 of two client systems using a hub system to interact with a collaboration entity instance. The method 400 can be carried out in the architecture 100 of FIG. 1. At 404, a first request is received from a first client computing system. The first request causes a first collaboration entity instance to be instantiated and includes at least a portion of data to be stored in the first collaboration entity instance. The data can include a name or other identifier, one or more objects to be included in the collaboration entity instance (either by reference or by value), or a list of collaborators approved to access information stored in the collaboration entity instance.

A first record is caused to be written in a blockchain at 408. The first record includes a first identifier of the first collaboration entity instance. The first identifier is generated from content of the first collaboration instance entity, which can include content of object instances included in, or referenced by, the first collaboration entity instance. In a specific example, the first identifier is a hash value generated by applying a hash function to content of the first collaboration entity instance.

At 412, a second request is received from a second client computing system to access the first collaboration entity instance. At least a portion of data stored in the first collaboration entity instance is sent to the second client computing system at 416 in response to the second request. At 420, a third request is received from the first client computing system or the second client computing system to access a first service provided by the hub system. The hub system is accessible to the first and second client computing systems. The third request is processed at 424 using the first service. At 428, a second record is caused to be written in the blockchain reflecting the processing of the third request.

FIG. 4B is a flowchart of an example method 440 operating a collaboration hub such as the hub system 112 of FIG. 1. At 444, a first request is received to create a collaboration entity instance associated with a first type of a first plurality of defined collaboration entity types. The collaboration entity instance is instantiated at 448 in response to the first request. At 452, a request is made to record in a blockchain a first record corresponding to the instantiating. A second request is received at 456 to create a first object instance to be stored in, or associated with, the collaboration entity instance. The first object instance has a second type selected from a second plurality of defined object types. At 460, it is requested that a second record, corresponding to including the first object instance in the collaboration entity instance or associating the first object instance with the collaboration entity instance, be recorded in the blockchain. The collaboration entity instance can be accessed and modified by a plurality of client systems, and events for the collaboration entity instance can be verified by accessing the blockchain.

Figure 4C:
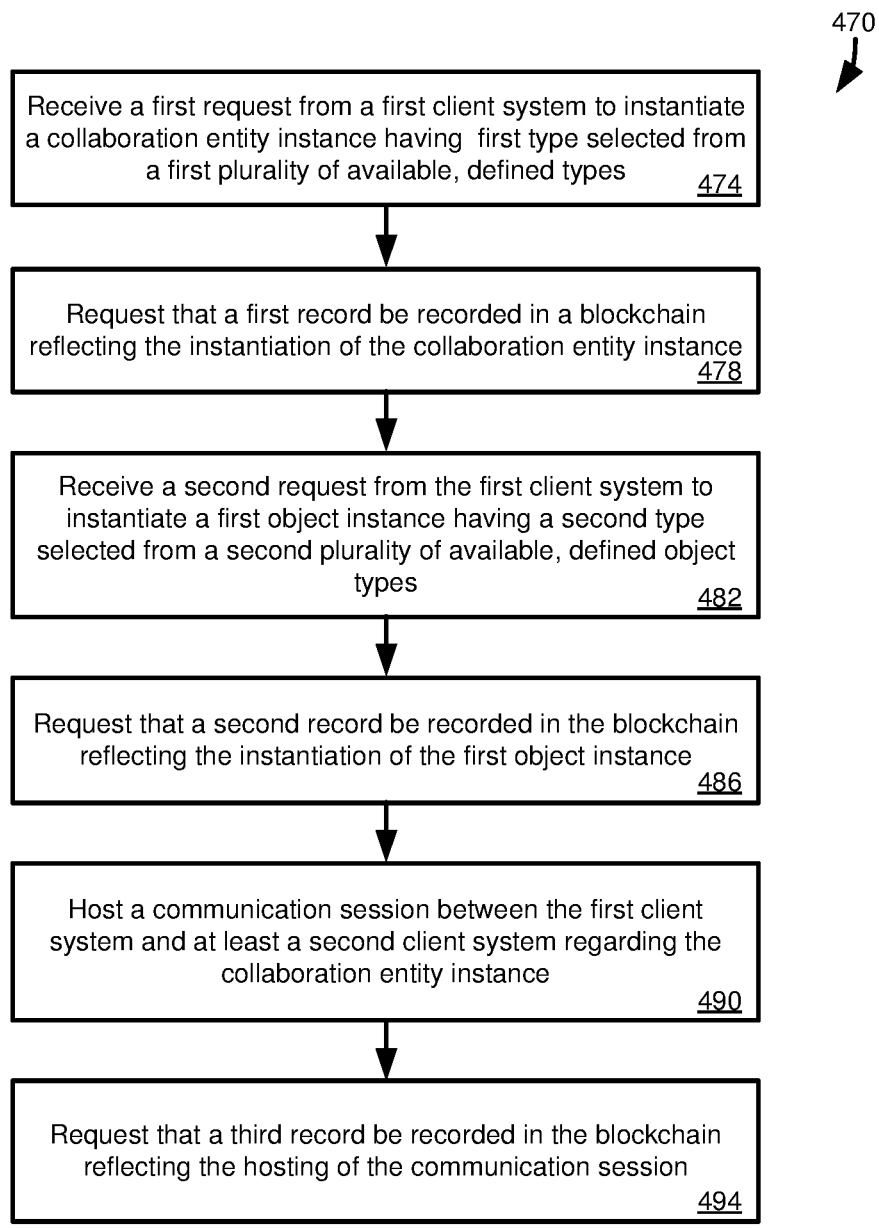

FIG. 4C is a flowchart of a method 470 for facilitating collaborations between a plurality of client systems using a hub system that includes a plurality of hub services that are configured to record activities related to collaboration entity instances of the hub system in a blockchain. The method 470 can be carried out in the architecture 100 of FIG. 1.

At 474, a first request is received from a first client system to instantiate a collaboration entity instance having a first type selected from a first plurality of available, defined collaboration entity types. It is requested at 478 that a first record be recorded in a blockchain reflecting the instantiation of the collaboration entity instance. At 482, a second request is received from the first client system to instantiate a first object instance having a second type selected from a second plurality of available, defined object types. The first object instance is to be included in, or referenced by, the collaboration entity instance. It is requested at 486 that a second record be recorded in the blockchain reflecting the instantiation of the first object instance.

At 490, a communication session, such as a chat session, is hosted between the first client system and at least a second client system regarding the collaboration entity instance. It is requested at 494 that a third record be recorded in the blockchain reflecting the hosting of the communication session.

Example 6—Computing Systems

Figure 5:
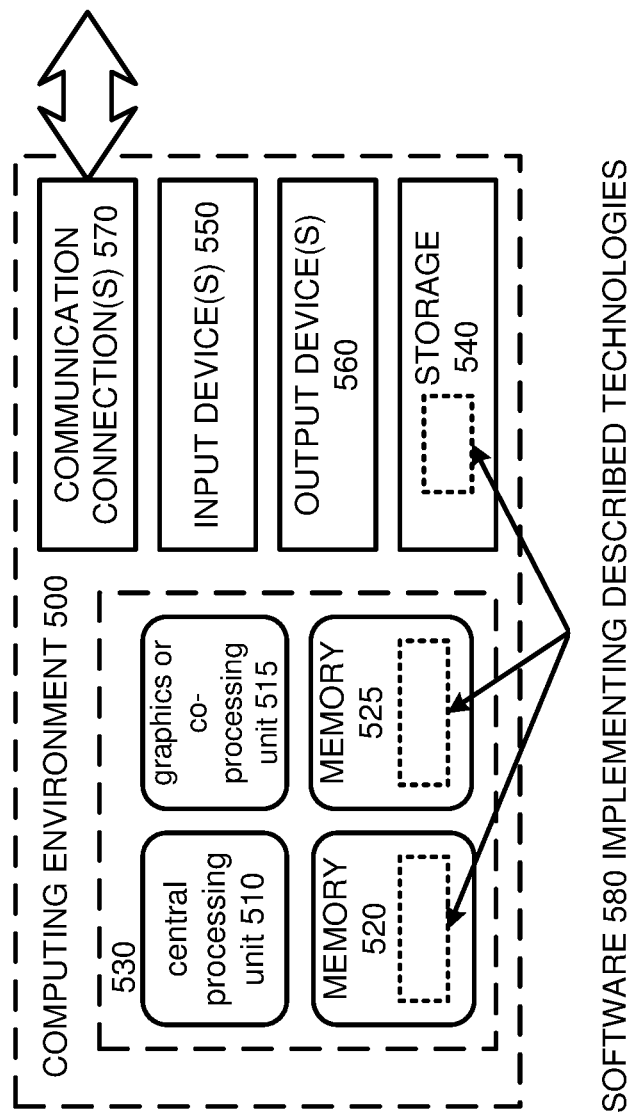
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality of the present disclosure, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions, such as for implementing components of the computing architecture 100 of FIG. 1, including as described in Examples 1-5. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s) 510, 515. The memory 520, 525 stores software 580 implementing one or more innovations described herein, in the form of computer-executable instructions suitable for execution by the processing unit(s) 510, 515.

A computing system 500 may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way, and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Cloud Computing Environment

Figure 6:
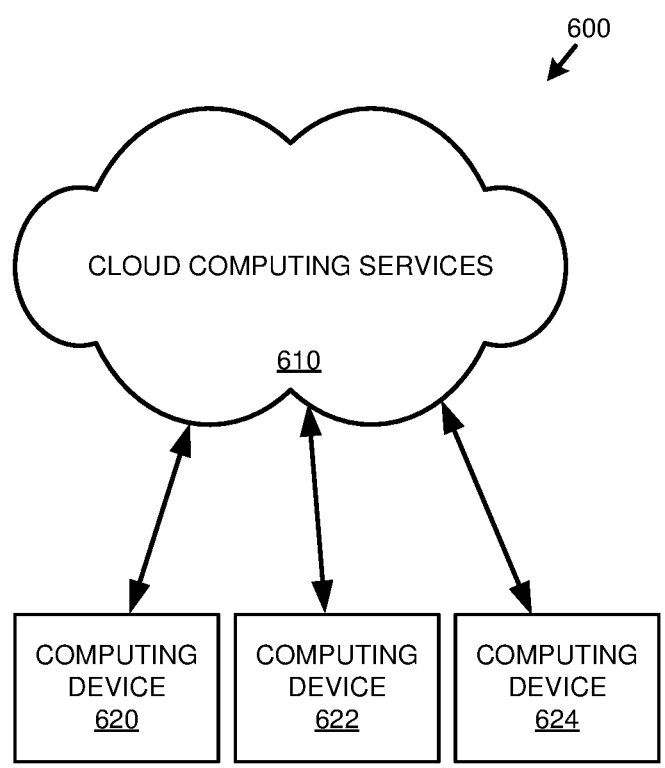
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example 8—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more non-transitory computer readable storage media storing instructions that, when executed, cause the computing system to perform operations comprising:
   receiving a first request from a first client computing system, the first request causing a first collaboration entity instance to be instantiated and comprising at least a portion of data to be stored in the instantiated first collaboration entity instance, wherein an instance of a collaboration entity, including the first collaboration entity instance, comprises one or more data members configured to store identifiers for a plurality of objects associated with a given collaboration entity instance, and an identifier is assigned to the collaboration entity instance;
   causing a first record to be written in a blockchain indicating the instantiation of the first collaboration entity instance, the first record comprising a first identifier of the first collaboration entity instance generated from content of the first collaboration entity instance;
   receiving a second request from a second client computing system to access the first collaboration entity instance;
   sending at least a portion of data stored in the first collaboration entity instance to the second client computing system in response to the second request;
   receiving a third request from the first client computing system or the second client computing system for a first service provided by a hub system, the hub system being accessible to the first client computing system and the second client computing system;
   processing the third request using the first service;
   causing a second record to be written in the blockchain reflecting the processing of the third request and comprising information usable to identify the first service, wherein the second record comprises the first identifier;
   receiving a fourth request from the first client computing system or the second client computing system for a second service provided by the hub system, the second service being different than the first service;
   processing the fourth request using the second service; and
   causing a third record to be written in the blockchain reflecting the processing of the fourth request and comprising information usable to identify the second service, wherein the third record comprises the first identifier.

2. The computing system of claim 1, the operations further comprising:
   detecting that a change was made to the first collaboration entity instance; and
   recording the change to the first collaboration entity instance in a third record in the blockchain.

3. The computing system of claim 2, wherein the second request indicates the change to the first collaboration entity instance and the third record is the second record.

4. The computing system of claim 1, the operations further comprising:
   associating a first data object instance with the first collaboration entity instance.

5. The computing system of claim 4, wherein the first data object instance is not stored in the first record or in the second record.

6. The computing system of claim 1, wherein the first service is a chat service and the third request initiates a chat session between the first client computing system and the second client computing system and the second record indicates that the chat session was conducted between the first client computing system and the second client computing system.

7. The computing system of claim 6, the operations further comprising:
   recording the chat session; and
   storing the recorded chat session.

8. The computing system of claim 1, wherein the hub system comprises one or more software applications accessible to the first client computing system and the second client computing system to access the first collaboration entity instance.

9. The computing system of claim 8, wherein the one or more software applications can call the first service.

10. The computing system of claim 1, wherein the first service is one of a plurality of services provided by the hub system and is selected from the group consisting of a versioning service, an attribution service, an audit service, a fingerprint service, and a chat service.

11. The computing system of claim 1, wherein the first client computing system and the second client computing system maintain nodes of the blockchain.

12. The computing system of claim 1, wherein the first identifier of the first collaboration entity comprises a hash value.

13. The computing system of claim 1, the operations further comprising:
   receiving a request to authenticate a third record in the blockchain, which can be the first record or the second record, as associated with the first collaboration entity instance;
   determining a second identifier for the first collaboration entity instance;
   comparing the second identifier with a fourth identifier stored in the third record, where the fourth identifier can be the first identifier;
   determining that the second identifier corresponds to the fourth identifier; and
   determining that the second identifier corresponds to the fourth identifier, returning an indication authenticating the third record.

14. The computing system of claim 1, wherein the hub system stores a plurality of data object instances related to the first collaboration entity instance, the plurality of data object instances associated with one or more role indicators, and wherein requests to access the first collaboration entity instance include a role identifier and access is granted to object instances of the plurality of data object instances having role indicators matching the role identifier.

15. The computing system of claim 1, wherein the first collaboration entity instance is associated with a third blockchain record comprising information useable to access an object associated with the first collaboration entity instance and referenced in the first collaboration entity instance.

16. The computing system of claim 1, wherein the third request is to modify the first collaboration entity instance from a first version to a second version, wherein the second record stores the first identifier for the first version and stores a second identifier for the second version, the second identifier being generated from content of the second version of the first collaboration entity instance.

17. The computing system of claim 1, the operations further comprising:
   receiving a first notification from the first client computing system to be sent to the second client computing system; and
   sending the first notification to the second client computing system.

18. One or more computer-readable storage media comprising:
   computer-executable instructions that, when executed by a computing system, the computing system comprising at least one hardware processor and at least one memory coupled to the hardware processor, cause the computing system to receive a first request to create a collaboration entity instance associated with a first type of a first plurality of defined collaboration entity types, wherein an instance of a collaboration entity, including the collaboration entity instance, comprises one or more data members configured to store identifiers for a plurality of objects associated with a given collaboration entity instance, and an identifier is assigned to the collaboration entity instance;
   computer-executable instructions that, when executed by the computing system, cause the computing system to instantiate the collaboration entity instance in response to the first request;
   computer-executable instructions that, when executed by the computing system, cause the computing system to request that a first record corresponding to the instantiating be recorded in a blockchain, the first record comprising information useable to identify that the first record was recorded in response to instantiating the collaboration entity instance;
   computer-executable instructions that, when executed by the computing system, cause the computing system to receive a second request to create a first object instance to be stored in, or associated with, the collaboration entity instance, the first object instance having a second type selected from a second plurality of defined object types;
   computer-executable instructions that, when executed by the computing system, cause the computing system to request that a second record corresponding to including the first object instance in the collaboration entity instance, or associating the first object instance with the collaboration entity instance, be recorded in the blockchain, the second record comprising information useable to identify that the second record was recorded in response to the including or associating the first object instance; and
   wherein the collaboration entity instance can be accessed and modified by a plurality of client systems and events for the collaboration entity instance can be verified by accessing the blockchain.

19. The one or more computer-readable storage media of claim 18, wherein the collaboration hub comprises a plurality of hub services and at least one application and the first request is from the at least one application and the second request is from a hub service of the plurality of hub services.

20. A method, implemented in a computing system comprising a memory and one or more processors, the method comprising:
   receiving a first request from a first client system to instantiate a collaboration entity instance having a first type selected from a first plurality of available, defined, collaboration entity types, wherein an instance of a collaboration entity, including the collaboration entity instance, comprises one or more data members configured to store identifiers for a plurality of objects associated with a given collaboration entity instance, and an identifier is assigned to the collaboration entity instance;
   requesting that a first record be recorded in a blockchain reflecting the instantiation of the collaboration entity instance, the first record comprising useable to identify that the first record was written in response to instantiation of the collaboration entity instance;
   receiving a second request from the first client system to instantiate a first object instance having a second type selected from a second plurality of available, defined, object types, wherein the first object instance is to be included in, or referenced by, the collaboration entity instance;
   requesting that a second record be recorded in the blockchain reflecting the instantiation of the first object instance, the second record comprising information useable to identify that the second record was recorded in response to instantiation of the first object instance;
   hosting a communication session between the first client system and at least a second client system regarding the collaboration entity instance; and
   requesting that a third record be recorded in the blockchain reflecting the hosting of the communication session, the third record comprising information useable to identify that the third record was recorded in response to the hosting.

* * * * *